(12) United States Patent
Seki et al.

(10) Patent No.: US 8,773,409 B2
(45) Date of Patent: Jul. 8, 2014

(54) SKEW ADJUSTING APPARATUS, TRANSMITTING AND RECEIVING SYSTEM, AND SKEW ADJUSTING METHOD

(75) Inventors: Fujio Seki, Shinagawa (JP); Masati Ozawa, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1023 days.

(21) Appl. No.: 12/289,073

(22) Filed: Oct. 20, 2008

(65) Prior Publication Data
US 2009/0109047 A1    Apr. 30, 2009

(30) Foreign Application Priority Data

Oct. 24, 2007  (JP) .................................. 2007-276814

(51) Int. Cl.
| G09G 5/00 | (2006.01) |
| H04L 25/14 | (2006.01) |
| H04J 3/06 | (2006.01) |

(52) U.S. Cl.
CPC .............. *H04J 3/0682* (2013.01); *H04L 25/14* (2013.01)
USPC ........... 345/204; 340/653; 714/700; 713/500; 713/600; 713/503; 333/18

(58) Field of Classification Search
USPC ........... 345/204; 713/500, 600, 503; 714/700; 333/18
See application file for complete search history.

(56) References Cited

U.S. PATENT DOCUMENTS

| 3,909,822 | A | * | 9/1975 | Lee et al. .......................... 345/73 |
| 4,414,587 | A | * | 11/1983 | Weaver et al. .................... 360/76 |
| 5,894,226 | A | * | 4/1999 | Koyama .................... 324/762.02 |
| 2002/0071041 | A1 | * | 6/2002 | Pine ............................... 348/222 |
| 2004/0068682 | A1 | * | 4/2004 | Takei et al. ..................... 714/700 |
| 2005/0156859 | A1 | * | 7/2005 | Jang et al. ....................... 345/100 |
| 2006/0036915 | A1 | * | 2/2006 | Takei et al. ..................... 714/700 |
| 2007/0296868 | A1 | * | 12/2007 | Hall ............................... 348/685 |

FOREIGN PATENT DOCUMENTS

JP          10-13398          1/1998

* cited by examiner

*Primary Examiner* — William Boddie
*Assistant Examiner* — Sahlu Okebato
(74) *Attorney, Agent, or Firm* — Staas & Halsey LLP (57) ABSTRACT

A skew adjusting apparatus includes: latching circuits that latch other signals in synchronism with transition timing of the signal level of a reference signal among signals transmitted with a plurality of communication cables; delay elements that are provided on the plurality of communication cables, and delay the signals transmitted with the plurality of communication cables, respectively; and a controller that controls the delay elements based on the outputs of the latching circuits to adjust skews between the signals.

8 Claims, 12 Drawing Sheets

FIG. 1

PRIOR ART

INITIAL STATE

DELAY BLUE SIGNAL

FIG. 6B

ADDITIONALLY DELAY
BLUE SIGNAL

FIG. 6C

DELAY GREEN SIGNAL

FIG. 11B DELAY BLUE SIGNAL BY TWO STEPS (4 [NS])

FIG. 11C ADDITIONALLY DELAY BLUE SIGNAL BY ONE STEP (2 [NS])

FIG. 11D ADVANCE BLUE SIGNAL BY ONE STEP (2 [NS]) (UNDO)

FIG. 11E DELAY RED SIGNAL BY ONE STEP

FIG. 12

SKEW ADJUSTING APPARATUS, TRANSMITTING AND RECEIVING SYSTEM, AND SKEW ADJUSTING METHOD

BACKGROUND OF THE INVENTION

1. Field of the Invention

The present invention relates to a skew adjusting apparatus which is used for and is suitable for a remote unit that operates a server placed on a remote place with a keyboard, a mouse, and so on while a user is watching a display, as well as a transmitting and receiving system, and a skew adjusting method.

2. Description of the Related Art

Conventionally, there has been known a remote unit in which a remote server is connected to a display, a keyboard, and a mouse which are provided in the vicinity of a user via a LAN (local Area Network) cable, and the server is operated with the keyboard and the mouse while information is displayed on the display.

In the server side, a transmitting device which transmits signals from the server to the side of the display, the keyboard, and the mouse is provided as a piece of the remote unit, and in the side of the display, the keyboard, and the mouse, a receiving device which receives the signals transmitted from the transmitting device is provided as a piece of the remote unit.

To display an image on the display, the transmitting device transmits three types of RGB video signals to the receiving device with a plurality of signal lines which are connected between the transmitting device and the receiving device. However, when the signal lines connected between the transmitting device and the receiving device have lengths of several hundred meters and more, the lengths of signal lines transmitting a red signal, a green signal, and a blue signal, respectively, are different from each other, and hence differences between arrival times of the respective signals occur. A gap between the phases of the signals causes the color blur and the decrease in definition of characters displayed on the display. Therefore, a skew adjusting apparatus which adjust the differences between the arrival times of the respective signals is provided on the receiving device, so that skews between the signals are adjusted (see Japanese Laid-Open Patent Publication No. 10-13398).

Figure 1:
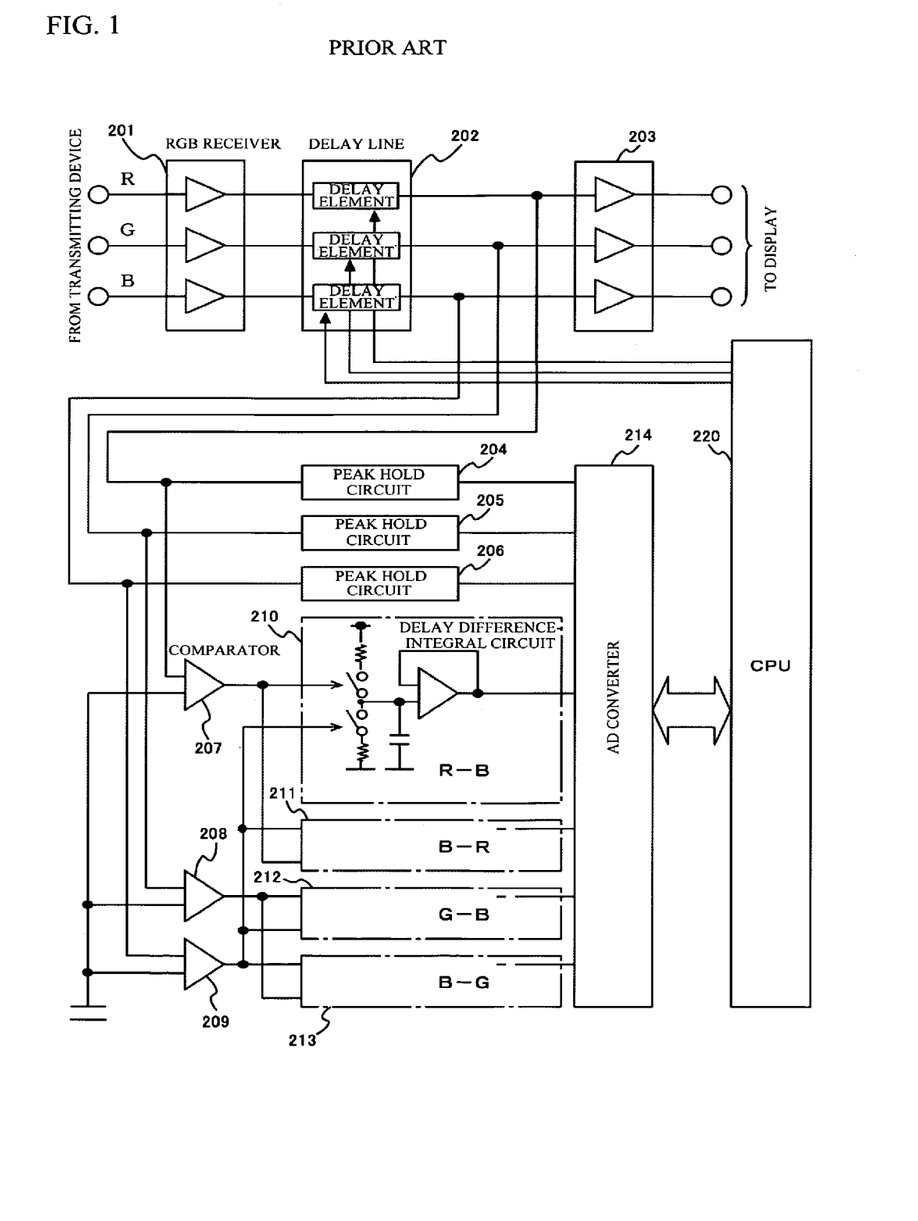
FIG. 1 is a diagram showing the configuration of a conventional skew adjusting apparatus.

FIG. 1 shows the configuration of a conventional skew adjusting apparatus provided on the receiving device. The receiving device in FIG. 1 is connected to the transmitting device with a LAN cable, and receives the RGB video signals, a horizontal synchronizing signal (Hsync), and a vertical synchronizing signal (Vsync) transmitted from the transmitting device via the LAN cable. Moreover, the receiving device transmits an operation signal input from the keyboard or the mouse to the transmitting device.

In the receiving device, a RGB receiver 201, a delay line 202, and an amplifier 203 are provided for each of RGB signal lines. The skews of the video signals received with the RGB receiver 201 are adjusted with delay elements of the delay line 202. The adjusted video signals are amplified with the amplifier 203, and then are output to the display.

In the receiving device, peak hold circuits 204, 205 and 206, comparators 207, 208 and 209, delay difference-integral circuits 210, 211, 212 and 213, AD (analog-to-digital) converter 214, and a CPU 220 are provided.

The peak hold circuits 204, 205 and 206 are connected to the respective RGB signal lines, and detect the peak values of the RGB signals. The detected peak values are AD-converted with the AD converter 214, and the AD-converted peak values are input to the CPU 220.

The comparators 207, 208 and 209 are also connected to the RGB signal lines, respectively. A reference voltage is input to the comparators 207, 208 and 209. When voltage levels of the RGB signal lines exceed the reference voltage, the comparator 207 outputs a notification signal to the delay difference-integral circuits 210 and 211, the comparator 208 outputs the notification signal to the delay difference-integral circuits 212 and 213, and the comparator 209 outputs the notification signal to the delay difference-integral circuits 210 to 213.

The delay difference-integral circuits 210 to 213 calculate delay-time differences between the blue signal as a reference signal and the red signal or the green signal, by integral. That is, the delay difference-integral circuits 210 calculates the advance-time (R-B) of the red signal from the blue signal as the reference signal, the delay difference-integral circuits 211 calculates the delay-time (B-R) of the red signal from the blue signal as the reference signal, the delay difference-integral circuits 212 calculates the advance-time (G-B) of the green signal from the blue signal as the reference signal, and the delay difference-integral circuits 213 calculates the delay-time (B-G) of the green signal from the blue signal as the reference signal. The pieces of the time information (i.e., the delay-time and the advance-time) calculated with the delay difference-integral circuits 210 to 213 are AD-converted with the AD converter 214, and are output to the CPU 220.

The CPU 220 controls the delay elements provided on the respective RGB signal lines based on the delay-time or the advance-time calculated with the delay difference-integral circuits 210 to 213, and performs skew adjustment between the red signal, the green signal and the blue signal.

However, the conventional skew adjusting apparatus in FIG. 1 uses the delay difference-integral circuits and the AD converter to measure the skews. Therefore, the circuit configuration of the conventional skew adjusting apparatus becomes complex and the cost of the conventional skew adjusting apparatus becomes expensive. Since the delay difference-integral circuits output analog signals, a program of the CPU which adjusts the difference between the phases of the RGB signals based on the measured skews becomes complex.

SUMMARY OF THE INVENTION

It is an object of the present invention to provide a skew adjusting apparatus which can achieve the skew adjustment between signals transmitted with a plurality of communication cables by easy circuit configuration, as well as a transmitting and receiving system, and a skew adjusting method.

According to a first aspect of the present invention, there is provided a skew adjusting apparatus, comprising: latching circuits that latch other signals in synchronism with transition timing of the signal level of a reference signal among signals transmitted with a plurality of communication cables; delay elements that are provided on the plurality of communication cables, and delay the signals transmitted with the plurality of communication cables, respectively; and a controller that controls the delay elements based on the outputs of the latching circuits to adjust skews between the signals.

With the above configuration, the skew adjustment between signals transmitted with the plurality of communication cables can be achieved by easy and inexpensive circuit configuration.

Since the controller controls the delay elements based on the outputs of the latching circuits, a control program of the controller can be simplified.

Preferably, in the skew adjusting apparatus, the latching circuits includes: a first latching circuit that latches a second signal in synchronism with transition timing of the signal level of a first signal; a second latching circuit that latches a third signal in synchronism with transition timing of the signal level of the first signal; a third latching circuit that latches the first signal in synchronism with transition timing of the signal level of the second signal; a fourth latching circuit that latches the third signal in synchronism with transition timing of the signal level of the second signal; a fifth latching circuit that latches the first signal in synchronism with transition timing of the signal level of the third signal; and a sixth latching circuit that latches the second signal in synchronism with transition timing of the signal level of the third signal.

Thus, the latching circuits are provided in the skew adjusting apparatus, and phase differences between each signal as the reference signal and other signals are detected. Therefore, the controller can set amounts of delays of the delay elements based on the phase differences with high accuracy. Further, the load of the controller can be reduced.

Preferably, the skew adjusting apparatus further includes lamps for monitoring that are lighted or extinguished depending on the signal levels of the other signals latched with the latching circuits, and manual adjusting portions that are capable of adjusting amounts of delays of the delay elements.

Therefore, a user can manually adjust skews while confirming a lighting state of the lamps for monitoring.

According to a second aspect of the present invention, there is provided a transmitting and receiving system which transmits and receives video signals with a plurality of communication cables, comprising: a transmitting device includes an outputting portion that outputs test signals for skew adjustment to the plurality of communication cables; and a receiving device includes: latching circuits that latch other test signals in synchronism with transition timing of the signal level of a reference test signal among the test signals transmitted with the plurality of communication cables; delay elements that are provided on the plurality of communication cables, and delay the test signals transmitted with the plurality of communication cables, respectively; and a controller that controls the delay elements based on the outputs of the latching circuits to adjust skews between the test signals.

According to a third aspect of the present invention, there is provided a skew adjusting method, comprising the steps of: latching other signals in synchronism with transition timing of the signal level of a reference signal among signals transmitted with a plurality of communication cables; and delaying the signals transmitted with the plurality of communication cables based on the signal levels of the latched other signals to adjust skews between the signals.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of an embodiment of the present invention.

(First Embodiment)

Figure 2:
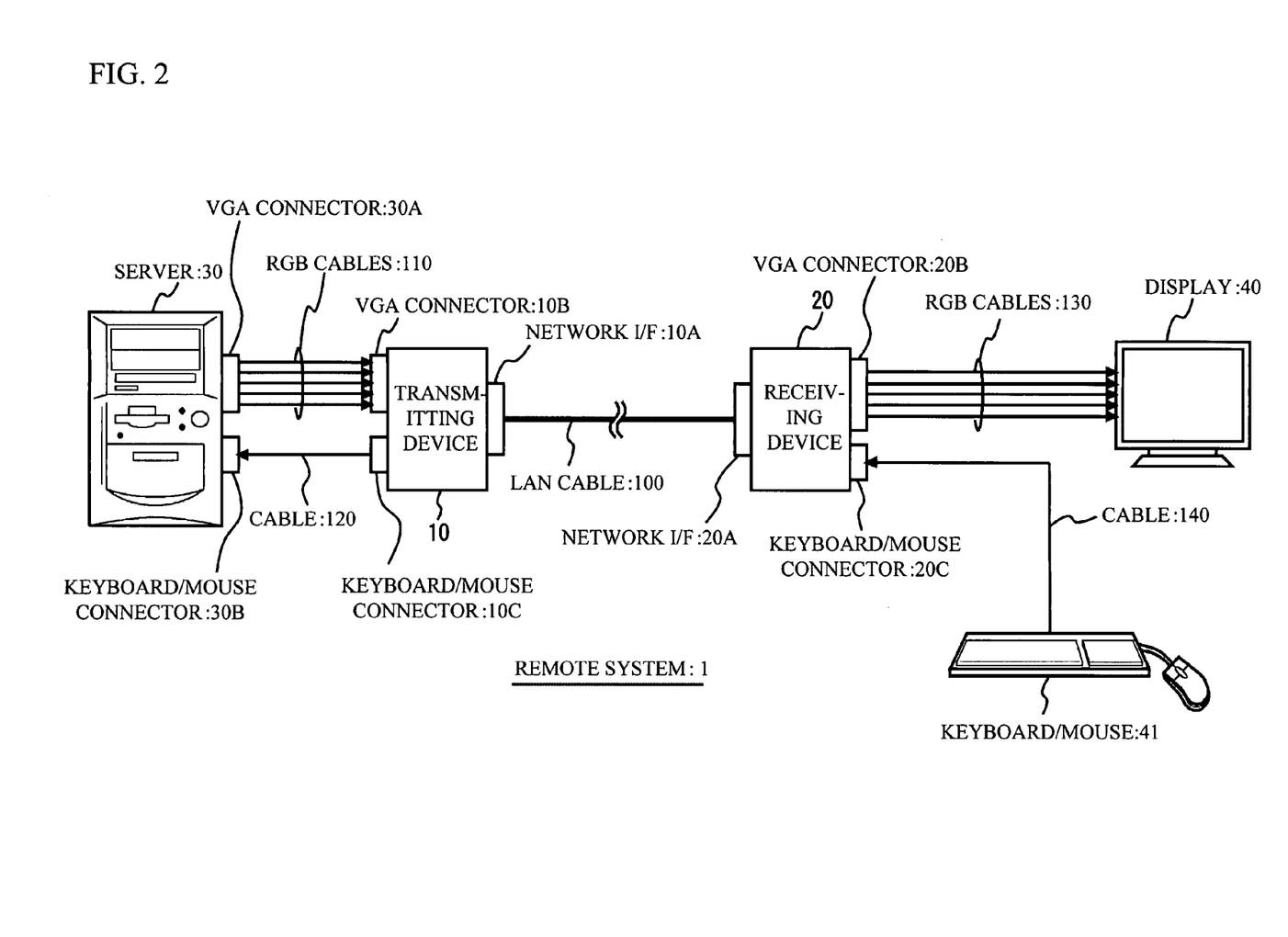
FIG. 2 is a diagram showing the configuration of a remote unit transmitting and receiving video signals.

First, a description will now be given of the configuration of a system to which a skew adjusting apparatus is applied with reference to FIG. 2.

In a remote system 1, a transmitting device 10 and a receiving device 20 as a remote unit are provided between a server 30, and a display 40 and a keyboard and mouse 41 (hereinafter referred to as a "keyboard/mouse").

The transmitting device 10 and the receiving device 20 are connected to each other with a LAN cable 100 so as to be able to transmit and receive signals therebetween. Therefore, network interfaces 10A and 20A are installed in the transmitting device 10 and the receiving device 20. For instance, a CAT5 cable, a CAT5e cable and so on can be applied to the LAN cable 100. The network interfaces 10A and 20A do not assume a network interface layer in an OSI reference model. Any interfaces have the configuration such that three video signals (i.e., a red signal, a green signal, and a blue signal), a horizontal synchronizing signal (Hsync), a vertical synchronizing signal (Vsync), and a signal output from the keyboard/mouse 41 (hereinafter referred to as an "operation signal") can be transmitted or received can be applied to the network interfaces 10A and 20A.

The server 30 is composed of an information processing apparatus such as a personal computer, or a workstation.

The transmitting device 10 has a VGA (Video Graphic Array) connector 10B which inputs the video signals (RGB), the horizontal synchronizing signal, and the vertical synchronizing signal from the server 30. For example, a general connector such as a BNC connector, or a D-sub 15 pins connector can be used as the VGA connector 10B.

The transmitting device 10 has a keyboard/mouse connector 10C which inputs the operation signal transmitted from the receiving device 20 to the server 30. A connector used for the connection of a general keyboard and a general mouse such as a PS/2 connector, a USB (Universal serial Bus) connector, and other serial connector can be used as the keyboard/mouse connector 10C.

Similarly to the general information processing apparatus, a VGA connector 30A outputting the video signals and a keyboard/mouse connector 30B inputting the operation signal from the keyboard/mouse 41 are provided in the server 30. Therefore, the VGA connector 10B provided on the surface of a housing of the transmitting device 10 is connected to the VGA connector 30A provided on the surface of a housing of the server 30 with an RGB cable 110 composed of, for example, the BNC cable, the D-sub 15 pins cable, or the like. Similarly, the keyboard/mouse connector 10C provided on the surface of the housing of the transmitting device 10 is connected to the VGA connector 30B provided on the surface of the housing of the server 30 with a cable 120 used for the connection of a general keyboard and a general mouse such as a PS/2 cable, a USB cable, and other serial cable.

The receiving device 20 has a VGA connector 20B as a display connector which outputs the video signals (RGB), the horizontal synchronizing signal, and the vertical synchronizing signal to the display 40. For example, the general connector such as the BNC connector, or the D-sub 15 pins connector can be used as the VGA connector 20B. An RGB cable 130 is connected between the VGA connector 20B and the display 40. The RGB cable 130 is composed of, for example, the BNC cable, the D-sub 15 pins cable, or the like.

The receiving device 20 has a keyboard/mouse connector 20C inputting the operation signal output from the keyboard/mouse 41. A connector used for the connection of the general keyboard and the general mouse such as the PS/2 connector, the USB connector, and other serial connector can be used as the keyboard/mouse connector 20C. A cable 140 provided on the keyboard/mouse 41 is connected to the keyboard/mouse connector 20C. The cable 140 is composed of a cable used for the connection of the general keyboard and the general mouse such as the PS/2 cable, the USB cable, and other serial cable. In the receiving device 20, a driver circuit (not shown) which inputs the operation signal from the keyboard/mouse 41 and outputs the operation signal to the LAN cable 10 is provided. Similarly, in the transmitting device 10, a receiver (not shown) which receives the operation signal via the LAN cable 100 is provided. The received operation signal is output to the server 130 via the cable 120.

Figure 3:
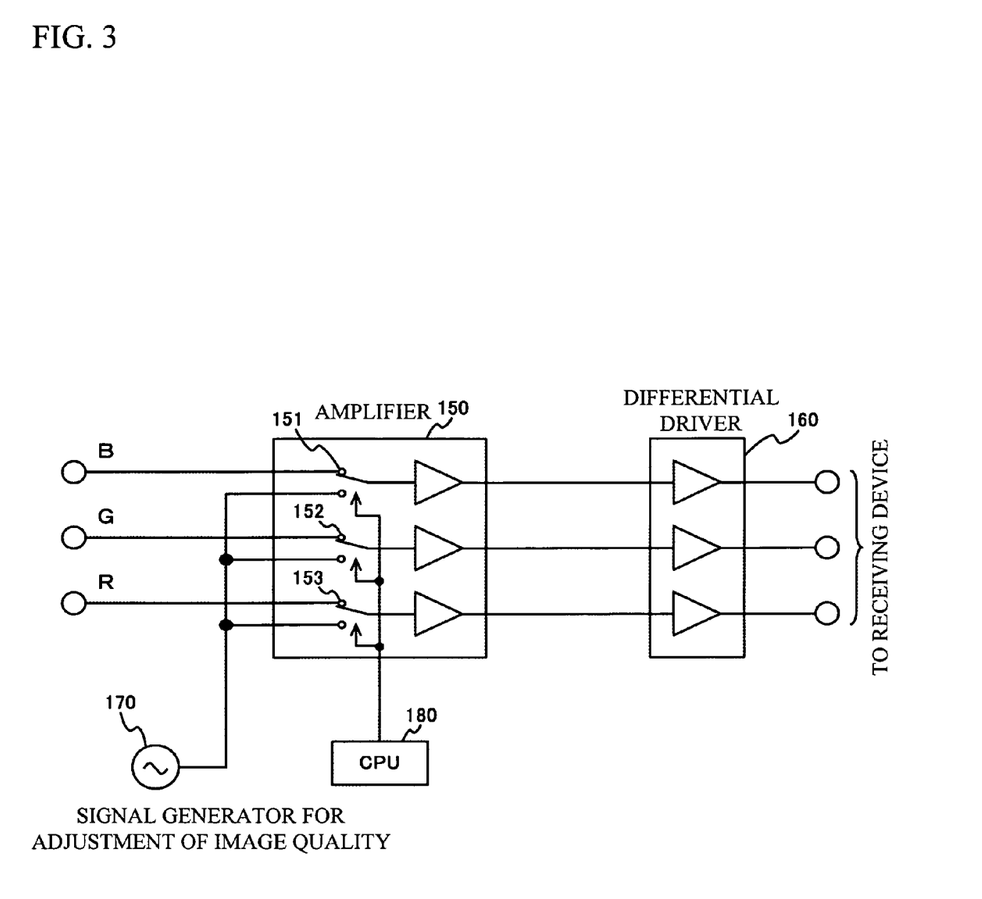
FIG. 3 is a diagram showing the configuration of a signal transmitting unit in a transmitting device.

FIG. 3 shows the configuration of a signal transmitting unit 145 of the transmitting device 10 in detail. The signal transmitting unit 145 of the transmitting device 10 includes an amplifier 150 that amplifies the video signals transmitted to the receiving device 20 and a test signal for the adjustment of image quality, and a differential driver 160 that outputs signals to the LAN cable. The differential driver 160 converts the video signals amplified with the amplifier 150 into differential signals, and outputs the differential signals to the RGB signal lines, respectively.

Also, a signal generator 170 for the adjustment of image quality is provided in the signal transmitting unit 145. When the transmission of the test signal for the adjustment of image quality is requested from the receiving device 20, a CPU 180 switches each of switches 151, 152 and 153 provided in the amplifier 150 so as to connect each of switches 151, 152 and 153 to the signal generator 170 for the adjustment of image quality. The signal generator 170 for the adjustment of image quality outputs the test signal for the adjustment of image quality to the LAN cable 100 according to the control of the CPU 180.

The receiving device 20 receives the test signal for the adjustment of image quality, and adjusts skews between the red signal, the green signal, and the blue signal with a skew adjusting apparatus 200 as described later.

Figure 4:
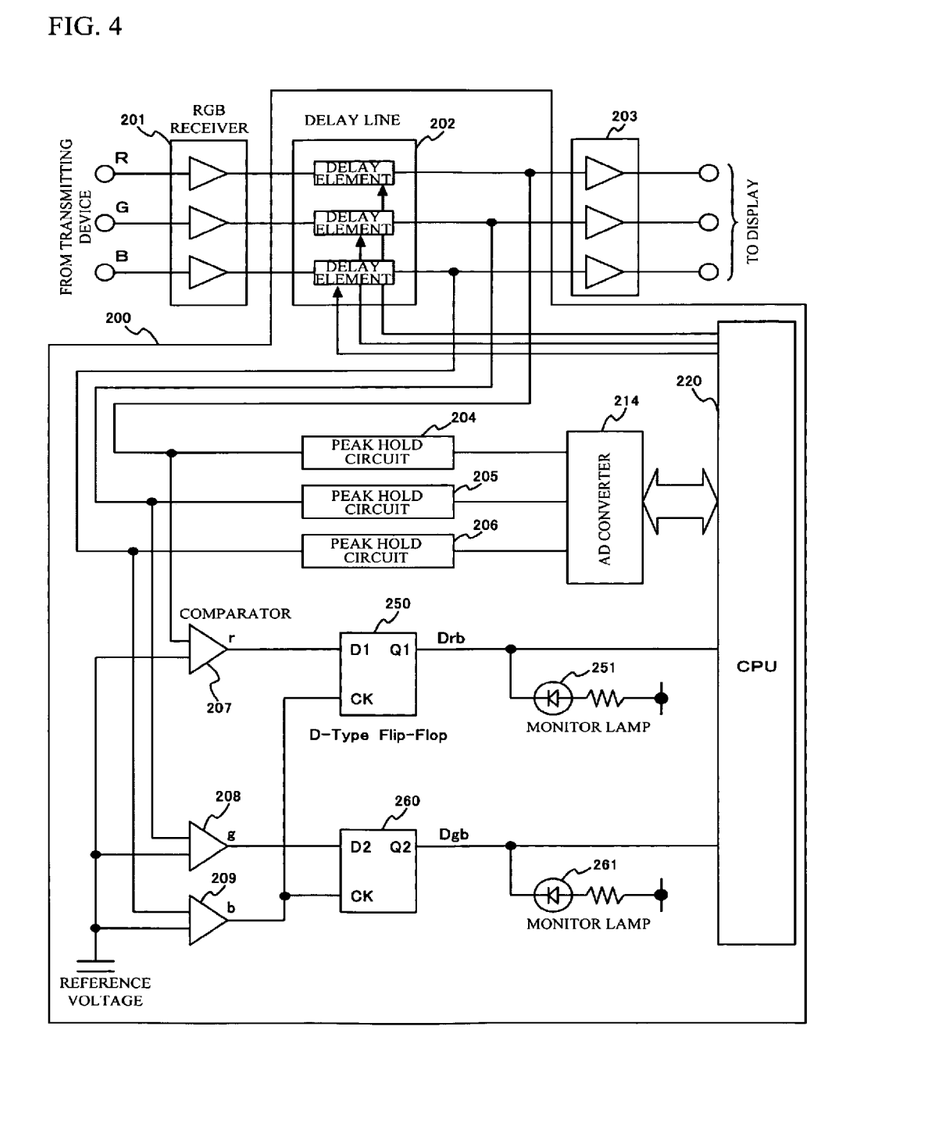
FIG. 4 is a diagram showing the configuration of a receiving device and a skew adjusting apparatus.

A description will be given of the configuration of the receiving device 20 with reference to FIG. 4. Corresponding component elements to those included in the conventional skew adjusting apparatus in FIG. 1 are designated by the same reference numerals, and description of these component elements is omitted.

In the present embodiment, as the skew adjusting apparatus 200 in the receiving device 20, a delay line 202, peak hold circuits 204, 205 and 206, an analog-to-digital (AD) converter 214, comparators 207, 208 and 209, D-type flip-flops 250 and 260, monitor lamps 251 and 252, and a CPU 220 are provided.

In the skew adjusting device 200 of the present embodiment, the D-type flip-flops 250 and 260 are provided on behalf of the delay difference-integral circuits 210, 211, 212 and 213 in FIG. 1.

The D-type flip-flop 250 inputs the output of the comparator 207 as data, and the output of the comparator 209 as a clock. That is, the D-type flip-flop 250 sets the input timing of the blue signal as a trigger, and outputs a signal Drb which has latched an output state of the comparator 207 (i.e., an output state of the red signal) in the input timing of the blue signal to the CPU 220.

Also, the D-type flip-flop 260 inputs the output of the comparator 208 as data, and the output of the comparator 209 as a clock. Similarly, the D-type flip-flop 260 sets the input timing of the blue signal as a trigger, and outputs a signal Dgb which has latched an output state of the comparator 208 (i.e., an output state of the green signal) in the input timing of the blue signal to the CPU 220.

It should be noted that a D-type flip-flop which can operate at high speed, and has setup time of 1.5 nsec or less is suitable for each of the D-type flip-flops 250 and 260 in order to improve the accuracy of the skew adjustment.

When the signal Drb output from the D-type flip-flop 250 is a high level, a monitor lamp 251 is lighted. Similarly, when the signal Dgb output from the D-type flip-flop 260 is a high level, a monitor lamp 261 is lighted.

Figure 5:
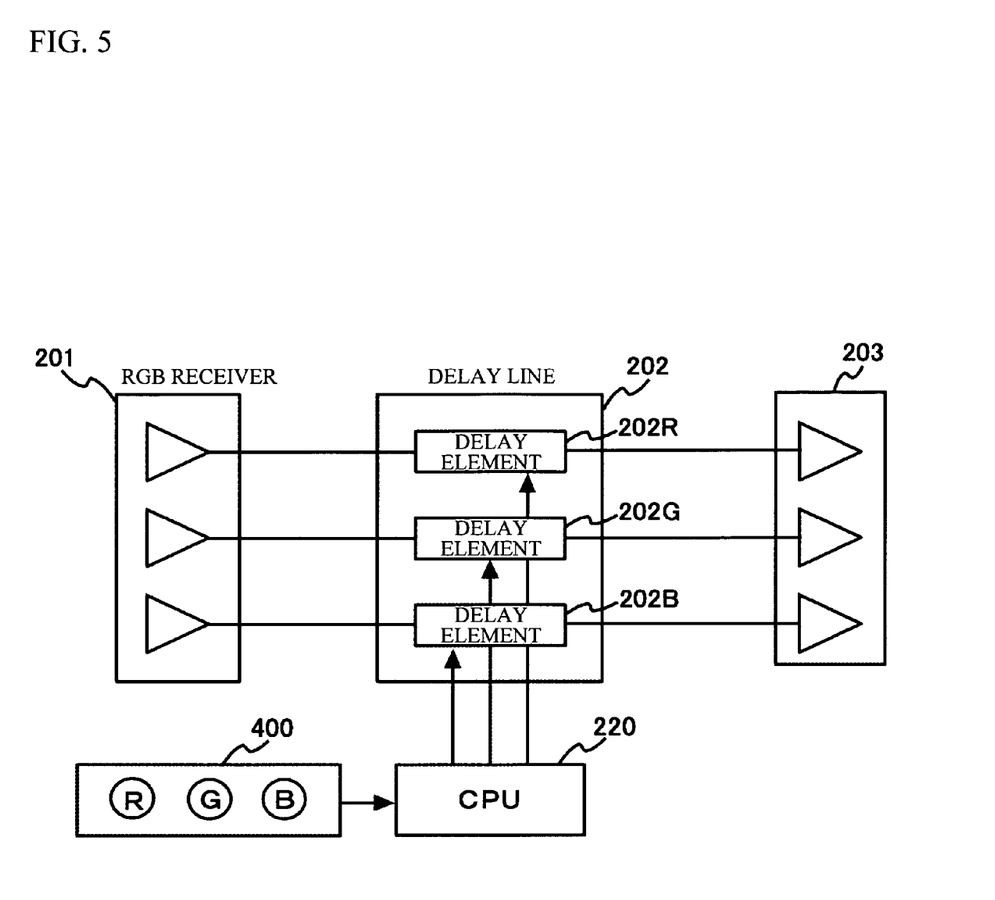
FIG. 5 is a diagram showing the configuration to operate amounts of the delay of delay elements by manual operation.

As shown in FIG. 5, delay elements 202R, 202G and 202B provided on the respective RGB signal lines as the delay line can adjust the amounts of delays of the RGB signals by the manual operation of a switch 400 for adjustment. Therefore, a user can adjust the skews while watching the lighting or the extinction of the monitor lamps 251 and 261.

A description will be given of a skew adjustment method of the skew adjusting apparatus 200 with reference to FIGS. 6 to 11.

Figure 6A:
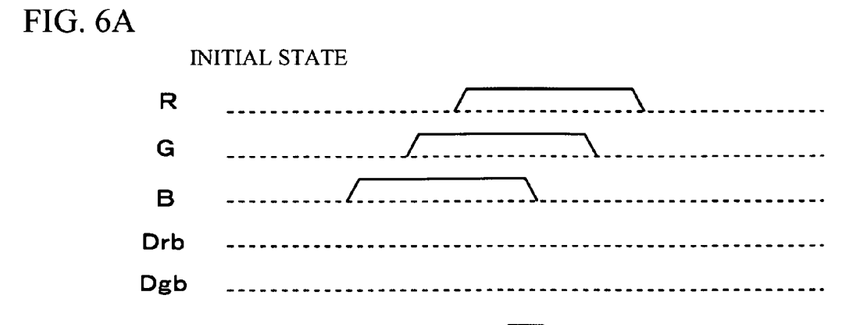
FIGS. 6A to 6D are diagrams showing phase adjustment procedures when the phases of a red signal, a green signal, and a blue signal advance in the order of the blue signal, the green signal, and the red signal.

FIG. 6A shows a state where the phase of the blue signal which is a reference signal is the most earliest, and the delays of the phases to the blue signal are growing in order of the green signal and the red signal.

Figure 6B:
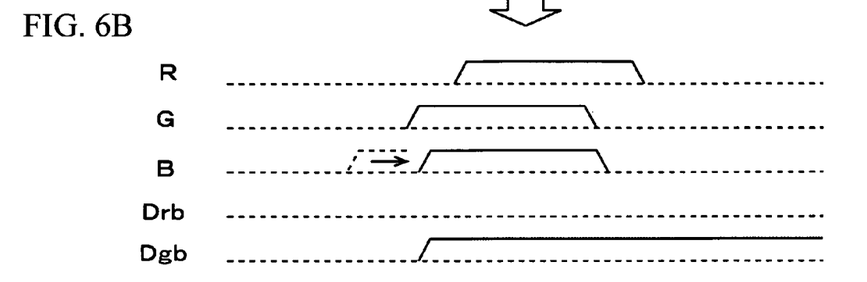
Figure 6C:
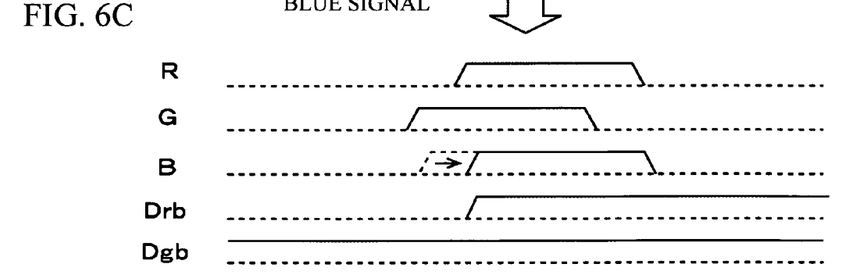
Figure 6D:
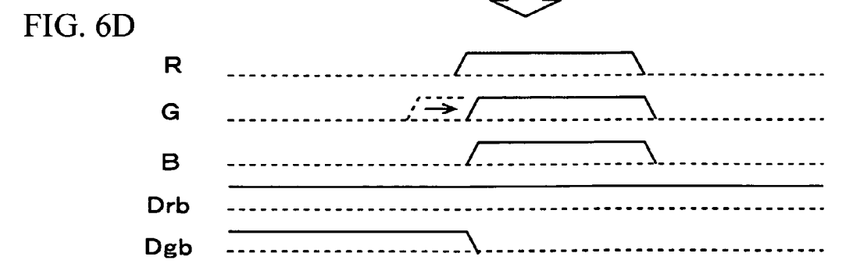

In the state in FIG. 6A, since the signals Drb and dgb are not the high levels, the CPU 220 adjusts the delay element 202B to delay the phase of the blue signal by one step. By this processing, it is assumed that the signal level of the signal Dgb has become the high level as shown in FIG. 6B. Next, since the signal level of the signal Drb keeps the low level, the CPU 220 adjusts the delay element 202B to additionally delay the phase of the blue signal by one step. By this processing, it is assumed that the signal level of the signal Drb has become the high level as shown in FIG. 6C. The CPU 220 determines that the phase of the blue signal is matched to that of the red signal, and delays the phase of the green signal by one step to execute the adjustment that matches the phase of the green signal to the phases of the red signal and the blue signal. By this processing, the signal level of the signal Dgb falls from the high level to the low level as shown in FIG. 6D. The CPU 220 determines that the adjustment that matches the phase of the green signal to the phases of the red signal and the blue signal has been completed by the changing of the signal level of the signal Dgb.

Figure 7A:
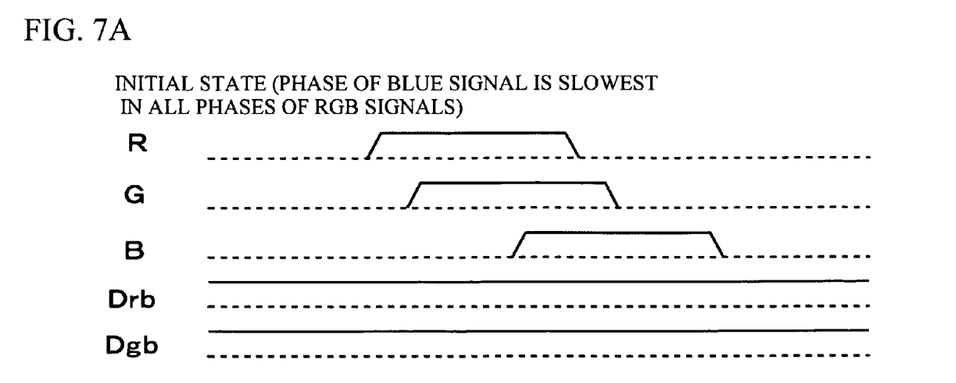
FIGS. 7A to 7C are diagrams showing phase adjustment procedures when the phases of the red signal, the green signal, and the blue signal advance in the order of the red signal, the green signal, and the blue signal.

FIG. 7A shows a state where the phase of the red signal is the most earliest, and the delays of the phases to the red signal are growing in order of the green signal and the blue signal.

Figure 7B:
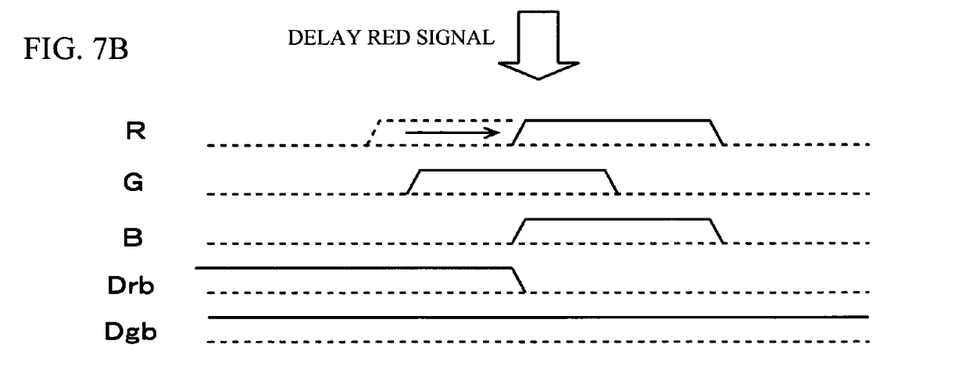
Figure 7C:
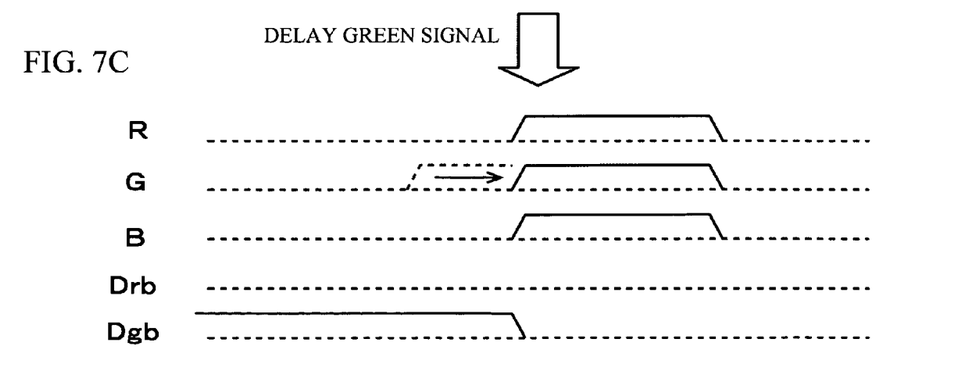

In this case, since the signal levels of the signals Drb and Dgb are the high levels, the CPU 220 determines that the phase of the B signal is delayed than the phases of the red signal, and the green signal. Therefore, the CPU 220 adjusts the delay element 202R to delay the phase of the red signal by one step. By this processing, it is assumed that the signal level of the signal Drb has become the low level from the high level as shown in FIG. 7B. The signal level of the signal Drb has become the low level, so that the CPU 220 determines that the adjustment that matches the phase of the red signal to the phase of the blue signal has been completed. Next, in order to match the phase of the green signal to the phases of the red signal and the blue signal, the CPU 220 adjusts the delay element 202G to delay the phase of the green signal by one step. By this processing, it is assumed that the signal level of the signal Dgb falls from the high level to the low level, as shown in FIG. 7C. The CPU 220 determines that the adjustment that matches the phase of the green signal to the phases of the red signal and the blue signal has been completed by the changing of the signal level of the signal Dgb.

Figure 8A:
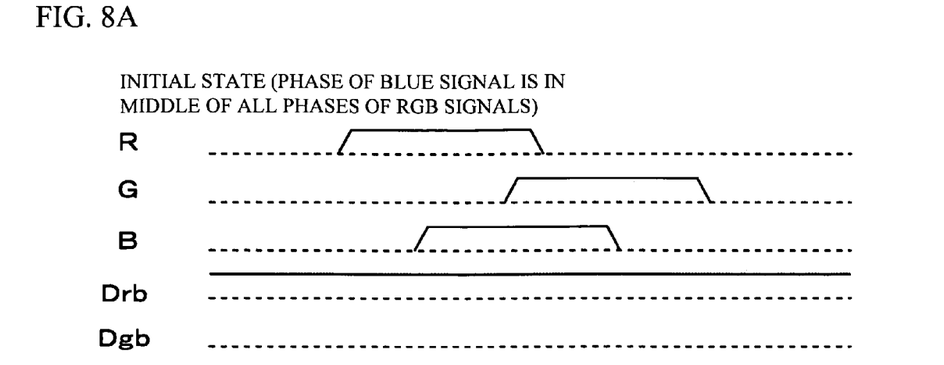
FIGS. 8A to 8C are diagrams showing phase adjustment procedures when the phases of the red signal, the green signal, and the blue signal advance in the order of the red signal, the blue signal, and the green signal.

FIG. 8A shows a state where the phase of the red signal is the most earliest, and the delays of the phases to the red signal are growing in order of the blue signal and the green signal.

Figure 8B:
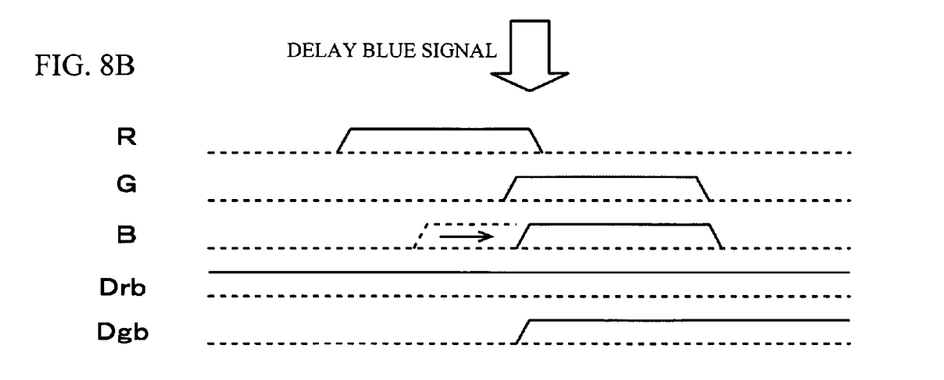
Figure 8C:
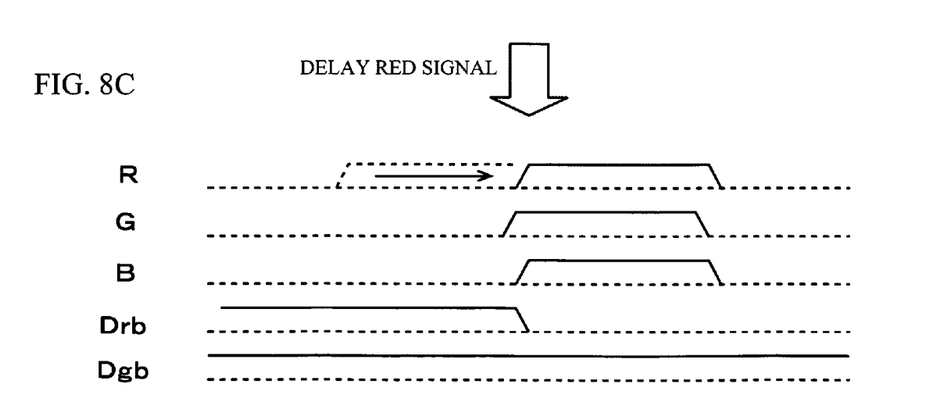

Since the signal level of the signal Drb is the high level, and the signal level of the signal Dgb is the low level, the CPU 220 first adjusts the delay element 202B to delay the phase of the blue signal by one step. By this processing, it is assumed that the signal level of the signal Dgb changes from the low level to the high level, as shown in FIG. 8B. The CPU 220 determines that the phase of the signal blue is matched to the phase of the green signal by the changing of the signal level of the signal Dgb. Next, in order to match the phase of the red signal to the phases of the green signal and the blue signal, the CPU 220 adjusts the delay element 202R to delay the phase of the red signal by one step. By this processing, it is assumed that the signal level of the signal Drb changes from the high level to the low level, as shown in FIG. 8C. The CPU 220 determines that the adjustment that matches the phase of the red signal to the phases of the green signal and the blue signal has been completed by the changing of the signal level of the signal Drb.

Figure 9A:
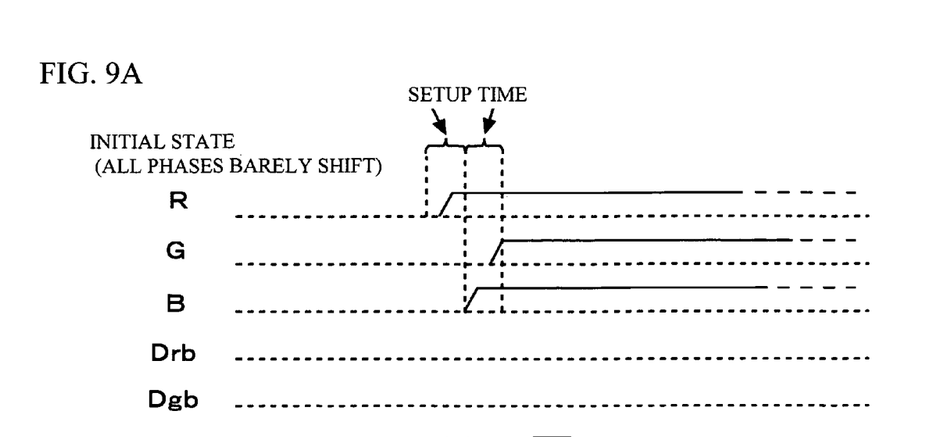
FIGS. 9A to 9C are diagrams showing phase adjustment procedures when the phases of the red signal, the green signal, and the blue signal advance in the order of the red signal, the blue signal, and the green signal, and a phase difference between the red signal and the blue signal and a phase difference between the green signal and the blue signal are within setup times.

FIG. 9A shows a state where the delays of the phases are growing in order of the red signal, the blue signal and the green signal, and phase differences between the red signal and the blue signal and between the green signal and the blue signal are shorter than setup times of the D-type flip-flops.

Figure 9B:
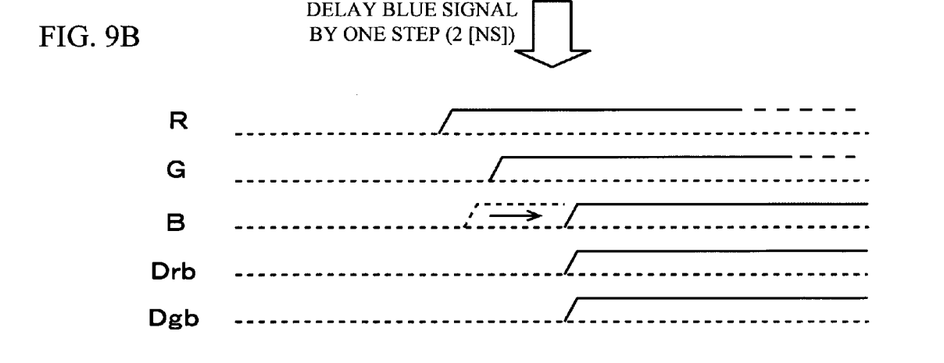
Figure 9C:
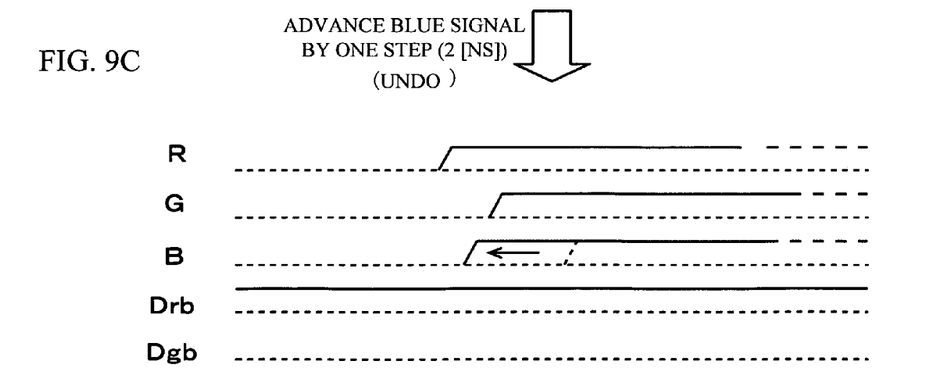

In order to confirm the phase difference between the blue signal, and the red and green signals, the CPU 220 first adjusts the delay element 202B to delay the blue signal by one step. By this processing, it is assumed that the signal levels of the signals Drb and Dgb change from the low level to the high level, as shown in FIG. 9B. The CPU 220 determines that the phase differences between the red signal and the blue signal and between the green signal and the blue signal in a state before the blue signal is delayed by one step are shorter than the setup times of the D-type flip-flops. Then, to shorten the phase difference between the green signal and the blue signal more than the setup time of the D-type flip-flop, the CPU 220 advances the blue signal by one step, as shown in FIG. 9C. That is, the CPU 220 executes an undo-processing. Since the D-type flip-flops do not operate normally when the phase differences exceeds the setup times, this processing is executed. By this processing, the CPU 220 determines that the adjustment that matches the phases of the red signal and the green signal to the phase of the blue signal has been completed.

FIG. 9A shows a case where, although the phases of the red signal and the green signal are more advanced than that of the blue signal, the phase difference between the green signal and the blue signal is shorter than the setup time of the D-type flip-flop, so that the signal Dgb does not become the high level.

Figure 10A:
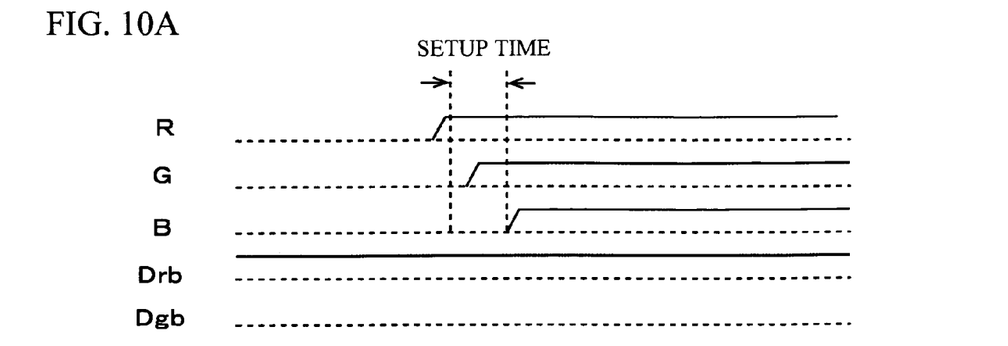
FIGS. 10A to 10D are diagrams showing phase adjustment procedures when the phases of the red signal, the green signal, and the blue signal advance in the order of the red signal, the green signal, and the blue signal, the phase difference between the red signal and the blue signal exceeds a setup time, and the phase difference between the green signal and the blue signal is within the setup time.
Figure 10B:
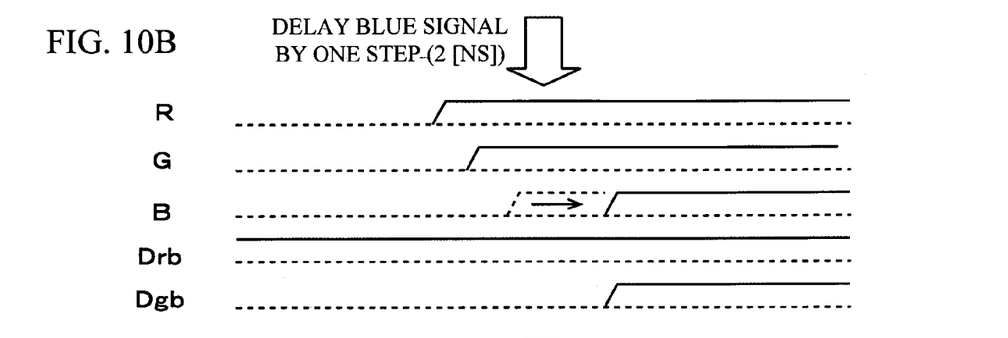
Figure 10C:
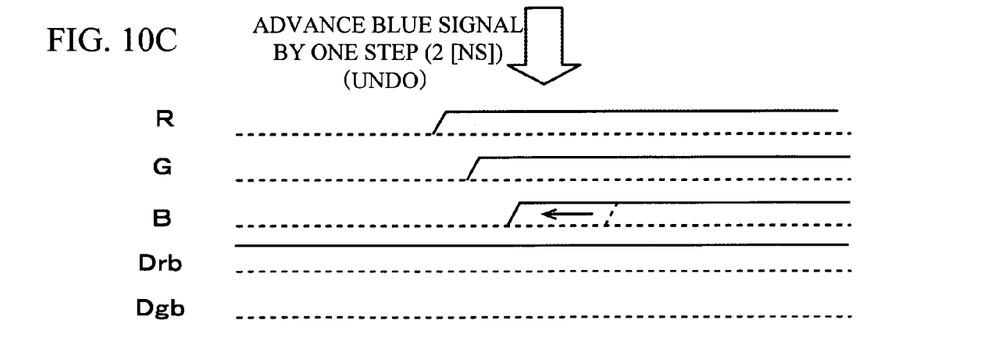

In order to confirm the phase difference between the blue signal, and the red and green signals, the CPU 220 first adjusts the delay element 202B to delay the blue signal by one step. By this processing, it is assumed that the signal levels of the signal Dgb changes from the low level to the high level, as shown in FIG. 10B. The CPU 220 determines that the phase difference between the green signal and the blue signal in a state before the blue signal is delayed by one step is shorter than the setup time of the D-type flip-flop by the changing of the signal level of the signal Dgb. Then, to shorten the phase difference between the green signal and the blue signal more than the setup time of the D-type flip-flop, the CPU 220 advances the blue signal by one step. That is, the CPU 220 executes an undo-processing. The state of the undo-processing is shown in FIG. 10C.

Figure 10D:
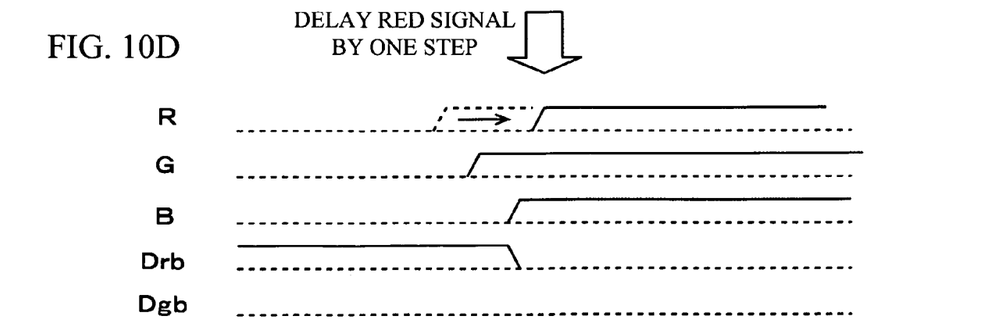

Next, the CPU executes processing to delay the phase of the red signal by one step in order to match the phase of the red signal to the phases of the green signal and the blue signal. A state after the processing is shown in FIG. 10D. It is assumed that the phase of the red signal is delayed by one step, so that the signal Drb changes from the high level to the low level. The CPU 220 determines that the adjustment that matches the phases of the red signal and the green signal to the phase of the blue signal has been completed by the changing of the signal level of the Drb.

Figure 11A:
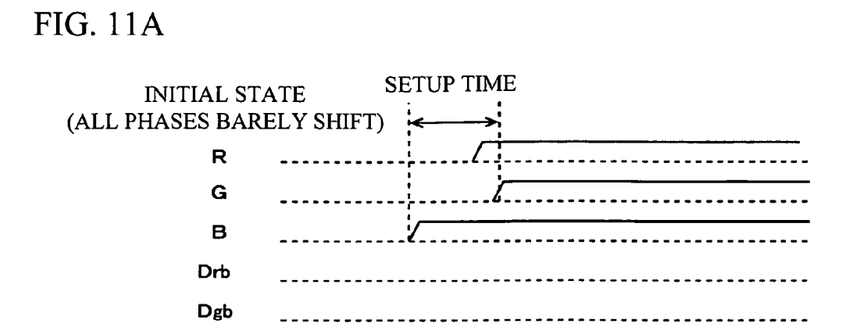
FIGS. 11A to 11E are diagrams showing phase adjustment procedures when the phases of the red signal, the green signal, and the blue signal advance in the order of the blue signal, the green signal, and the red signal, the phase difference between the red signal and the blue signal and the phase difference between the green signal and the blue signal are within a setup time.

FIG. 11A shows a case where the phase of the blue signal is more advanced than the phases of the red signal and the green signal, and the phase difference between: the blue signal, and the red and green signals is shorter than the setup time of the D-type flip-flop.

Figure 11B:
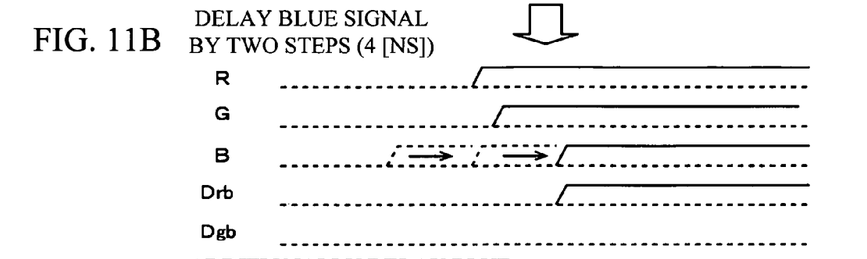
Figure 11C:
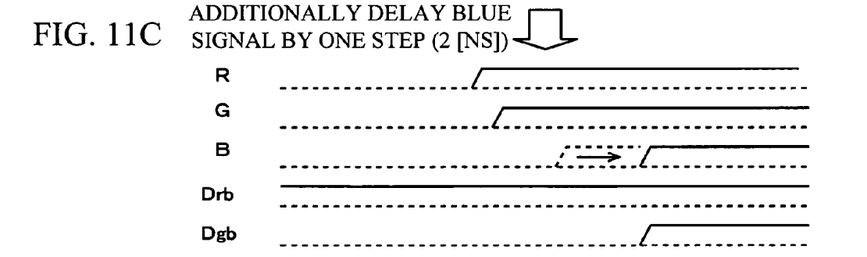

In order to confirm the phase difference between the blue signal, and the red and green signals, the CPU 220 first adjusts the delay element 202B to delay the blue signal by one step. Even if the blue signal is delayed by one step, the signals Drb and Dgb are changeless, and therefore the CPU 220 additionally delays the blue signal by one step. A state after this processing is shown in FIG. 11B. By this processing, it is assumed that the signal Drb changes from the low level to the high level. Next, the signal Dgb is changeless, and therefore the CPU 220 additionally delays the blue signal by one step. A state after this processing is shown in FIG. 11C. By this processing, it is assumed that the signal Dgb changes from the low level to the high level.

Figure 11D:
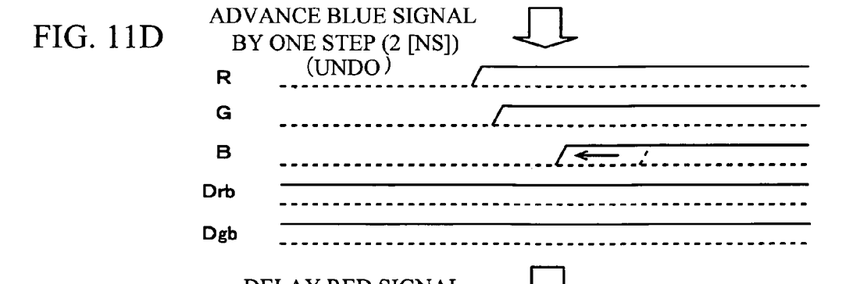
Figure 11E:
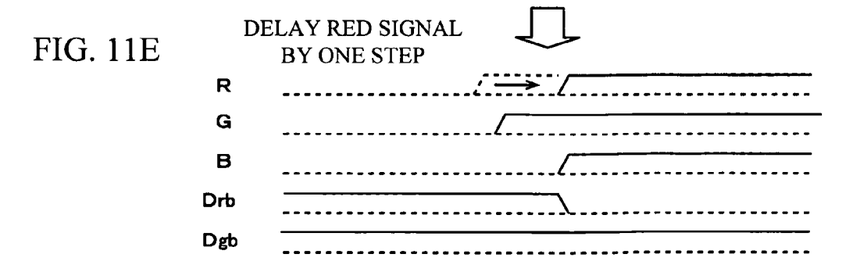

In a state shown in FIG. 11B before the blue signal is delayed by one step, the CPU 220 determines that the phase difference between the green signal and the blue signal is shorter than the setup time of the D-type flip-flop. Then, to shorten the phase difference between the green signal and the blue signal more than the setup time of the D-type flip-flop, the CPU 220 advances the blue signal by one step. That is, the CPU 220 executes an undo-processing. The state of the undo-processing is shown in FIG. 11D. Next, the CPU 220 delays the red signal by one step to shorten the phase difference between the blue signal and the red signal. The CPU determines that the adjustment that matches the phases of the red signal and the green signal to the phase of the blue signal has been completed by the changing of the signal Drb from the high level to the low level.

As described in detail above, in the present embodiment, the skew adjustment between signals transmitted with the plurality of communication cables can be achieved with the circuit that uses the simple and inexpensive D-type flip-flops.

Further, the CPU 220 controls the delay elements 202R, 202G and 202B based on digital signals output from the D-type flip-flops, so that the control program of the CPU 220 can be simplified.

(Second Embodiment)

Figure 12:
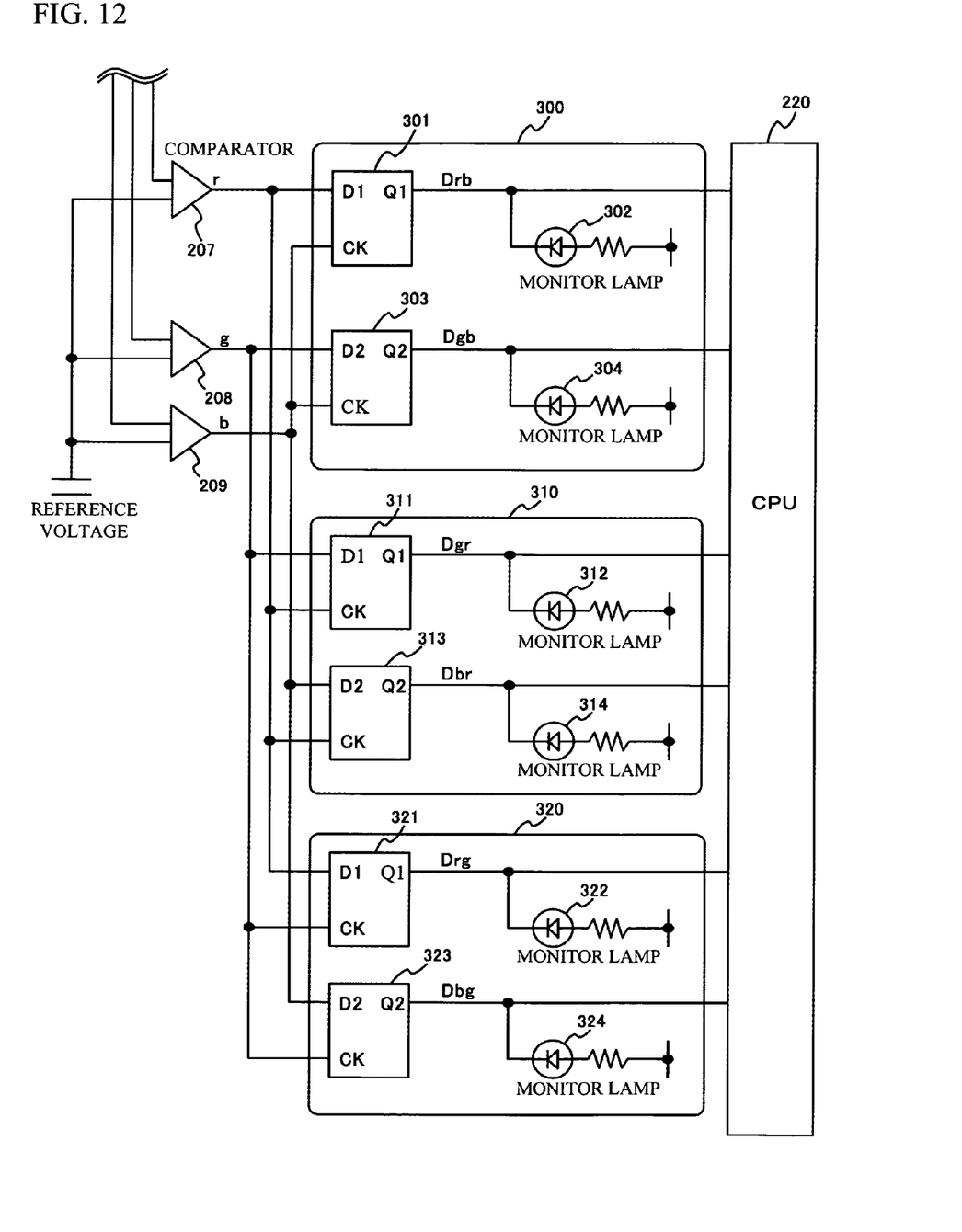
FIG. 12 is a diagram showing another configuration of the skew adjusting apparatus.

FIG. 12 shows the configuration of a skew adjusting apparatus according to a second embodiment.

In the above-mentioned first embodiment, the phase differences between the blue signal as the reference signal, and the red and green signals are detected. In the second embodiment, the skew adjusting apparatus includes: a first detecting circuit 300 that detects the phase differences between the blue signal as the reference signal, and the red and green signals; a second detecting circuit 310 that detects the phase differences between the red signal as the reference signal, and the green and blue signals; a third detecting circuit 320 that detects the phase differences between the green signal as the reference signal, and the red and blue signals.

Similarly to the first embodiment described above, the first detecting circuit 300 includes a D-type flip-flop 301 that inputs the blue signal as a clock, and the red signal as data, and a D-type flip-flop 303 that inputs the blue signal as a clock, and the green signal as data. A monitor lamp 302 is connected to an output side of the D-type flip-flop 301, and a monitor lamp 304 is connected to an output side of the D-type flip-flop 303.

The second detecting circuit 310 includes a D-type flip-flop 311 that inputs the red signal as a clock, and the green signal as data, and a D-type flip-flop 313 that inputs the red signal as a clock, and the blue signal as data. A monitor lamp 312 is connected to an output side of the D-type flip-flop 311, and a monitor lamp 314 is connected to an output side of the D-type flip-flop 313.

The third detecting circuit 320 includes a D-type flip-flop 321 that inputs the green signal as a clock, and the red signal as data, and a D-type flip-flop 323 that inputs the green signal as a clock, and the blue signal as data. A monitor lamp 322 is connected to an output side of the D-type flip-flop 321, and a monitor lamp 324 is connected to an output side of the D-type flip-flop 323.

Thus, not only the blue signal but also the red signal and the green signal are used as the reference signals, the phase differences between each of the reference signals and other signals are detected and output to the CPU 220, and hence the load of the software processing by the CPU 220 can be reduced.

The above-mentioned embodiments are suitable for the present invention. It should be noted that the present invention is not limited to the embodiments, and various modifications may be made to them without departing from the scope of the invention. For example, in the above-mentioned embodiments, although the D-type flip-flops are used as latching circuits, it is also possible to use other flip-flops.

The Present application is based on Japanese Patent Application No. 2007-276814 filed Oct. 24, 2007, the entire disclosure of which is hereby incorporated by reference.

What is claimed is:

1. A skew adjusting apparatus for adjusting skew of transmitted signals transmitted with a plurality of communication cables, comprising:
   latching circuits, each of which latches one of the transmitted signals in synchronism with a transition of the signal level of a reference signal selected from among the transmitted signals, the transmitted signals being RGB signals and the reference signal selected from among the transmitted signals being input as a clock signal;
   delay elements, each of which is provided on one of the plurality of communication cables, and delays the signal transmitted with the corresponding communication cable; and
   a controller that controls the delay elements based on the outputs of the latching circuits to adjust skews between the signals,
   wherein the controller changes a method for adjusting skews between the signals depending on whether a phase difference between the reference signal and the one of the transmitted signals other than the reference signal is shorter than a setup time of a corresponding latching circuit.

2. The skew adjusting apparatus as claimed in claim 1, wherein the skew adjusting apparatus receives a first signal, a second signal, and a third signal, and the latching circuits include:
   a first latching circuit that latches the second signal in synchronism with transition timing of the signal level of the first signal;
   a second latching circuit that latches the third signal in synchronism with transition timing of the signal level of the first signal;
   a third latching circuit that latches the first signal in synchronism with transition timing of the signal level of the second signal;
   a fourth latching circuit that latches the third signal in synchronism with transition timing of the signal level of the second signal;
   a fifth latching circuit that latches the first signal in synchronism with transition timing of the signal level of the third signal; and
   a sixth latching circuit that latches the second signal in synchronism with transition timing of the signal level of the third signal.

3. The skew adjusting apparatus as claimed in claim 1, further comprising lamps, each of which corresponds to one of the latching circuits, and is lighted or extinguished depending on the signal level of the signal latched with the corresponding latching circuit.

4. The skew adjusting apparatus as claimed in claim 2, further comprising lamps, each of which corresponds to one of the first to the sixth latching circuits, and is lighted or extinguished depending on the signal level of the signal latched with the corresponding latching circuit, and manual adjusting portions, each of which corresponds to one of the delay elements, and is capable of adjusting an amount of a delay of the corresponding delay element.

5. A transmitting and receiving system which transmits and receives video signals with a plurality of communication cables, comprising:
- a transmitting device includes an outputting portion that outputs test signals for skew adjustment to the plurality of communication cables; and
- a receiving device includes:
  - latching circuits, each of which latches one of the transmitted test signals other than a reference test signal selected from among the transmitted test signals in synchronism with transition timing of a signal level of the reference test signal, the transmitted test signals being RGB signals and the reference test signal selected from among the transmitted test signals being input as a clock signal;
  - delay elements, each of which is provided on one of the plurality of communication cables, and delays the test signal transmitted with the corresponding communication cable; and
  - a controller that controls the delay elements based on the outputs of the latching circuits to adjust skews between the test signals,
  - wherein the controller changes a method for adjusting skews between the test signals depending on whether a phase difference between the reference test signal and the one of the transmitted test signals other than the reference test signal is shorter than a setup time of a corresponding latching circuit.

6. A skew adjusting method for adjusting a skew of transmitted n signals transmitted with a plurality of communication cables, where n is a natural number equal to or greater than 2, comprising:
- latching n-1 signals among the transmitted n signals in synchronism with transition timing of a signal level of a reference signal which is a remainder of the transmitted n signals, the transmitted n signals being RGB signals and the reference signal selected from among the transmitted n signals being input as a clock signal;
- delaying the signal transmitted with the corresponding communication cable based on the signal level of the latched signal to adjust skews between the signals; and
- changing a method for adjusting skews between the signals depending on whether a phase difference between the reference signal and the one of the transmitted n signals other than the reference signal is shorter than a setup time of a corresponding latching.

7. The skew adjusting apparatus as claimed in claim 3, further comprising:
- manual adjusting portions that are capable of adjusting amounts of delays of the delay elements.

8. A skew adjusting apparatus for adjusting skew of transmitted n signals, where n is a natural number equal to or greater than 2, comprising:
- n delay elements, each of which is provided for one of the n signals, and delays the corresponding signal, respectively;
- n-1 latching circuits, each of which includes a clock terminal to which a signal output from one of the n delay elements is input, and a data terminal to which a signal output from one of the remainder of the n delay elements is input, and outputs a latched signal in synchronism with a transition of a signal level of the signal input to the clock terminal, the data terminal of each of the n-1 latching circuits receiving a different signal, respectively, the clock terminal inputting any one of RGB signals and the data terminal inputting another one of the RGB signals other than the one of the RGB signals input to the clock terminal; and
- a controller that controls an amount of delay of each delay elements on the basis of a signal output from each of latching circuits,
- wherein the controller changes a method for adjusting skews between the transmitted n signals depending on whether a phase difference between the signal input to the clock terminal and the signal input to the data terminal is shorter than a setup time of a corresponding latching circuit.

* * * * *

UNITED STATES PATENT AND TRADEMARK OFFICE
CERTIFICATE OF CORRECTION

PATENT NO. : 8,773,409 B2
APPLICATION NO. : 12/289073
DATED : July 8, 2014
INVENTOR(S) : Seki et al.

Page 1 of 1

It is certified that error appears in the above-identified patent and that said Letters Patent is hereby corrected as shown below:

On the Title Page Item [75] (Inventors), Line 1, delete "Masati" and insert -- Masato --, therefor.

In the Claims

Column 11, Line 33, in Claim 6, delete "n-1signals" and insert -- n-1 signals --, therefor.
Column 12, Line 19, in Claim 8, delete "n-1latching" and insert -- n-1 latching --, therefor.
Column 12, Lines 25-26, in Claim 8, delete "n-1latch-ing" and insert -- n-1 latching --, therefor.

Signed and Sealed this
Fifth Day of January, 2016

Michelle K. Lee
*Director of the United States Patent and Trademark Office*